Oct. 11, 1960   D. L. PARKHURST   2,955,467
PRESSURE-TYPE TIDE RECORDER
Filed Sept. 21, 1955   3 Sheets-Sheet 2

INVENTOR
Douglas L. Parkhurst

BY Arthur Vinograd
Leonard F. Stoll ATTORNEY
AGENT

Oct. 11, 1960  D. L. PARKHURST  2,955,467
PRESSURE-TYPE TIDE RECORDER
Filed Sept. 21, 1955  3 Sheets-Sheet 3
Fig. 4
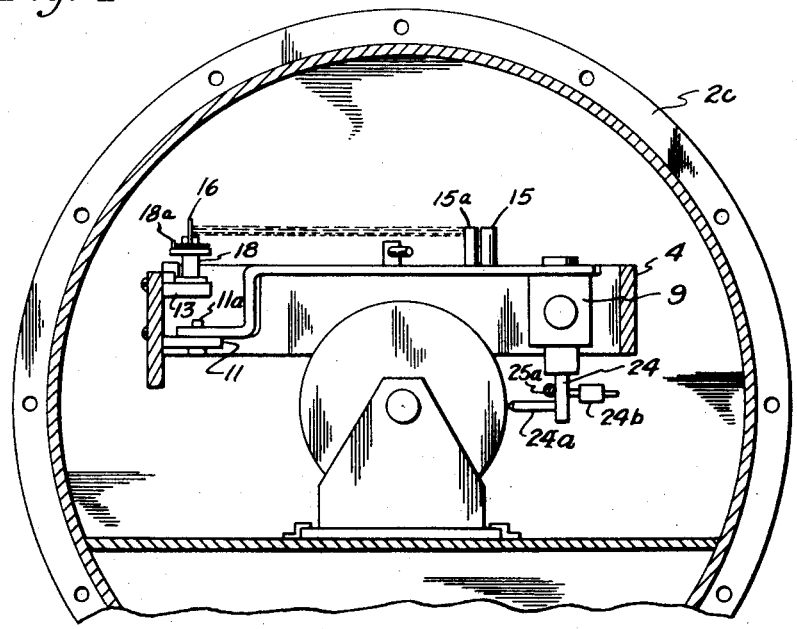
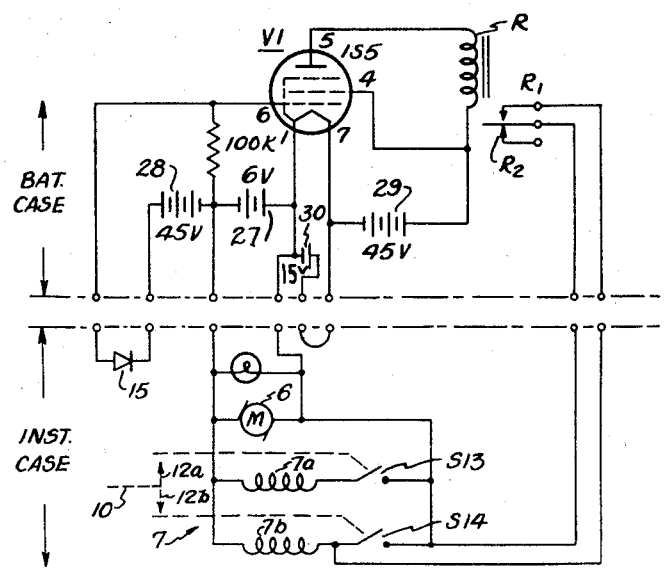
Fig. 5
INVENTOR
Douglas L. Parkhurst
BY
Arthur Vinograd
Leonard F. Stoll ATTORNEY
AGENT United States Patent Office 2,955,467
Patented Oct. 11, 1960

2,955,467

PRESSURE-TYPE TIDE RECORDER

Douglas L. Parkhurst, Chevy Chase, Md.; Douglas L. Parkhurst, Jr., executor of said Douglas L. Parkhurst, deceased Filed Sept. 21, 1955, Ser. No. 535,582

4 Claims. (Cl. 73—300)

(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952), section 266.

This invention relates to tide measuring and recording devices and has for a particular object the provision of a unitary, self-containing measuring and recording apparatus adapted to be anchored in a body of water.

In order to maintain the accuracy of navigation information, it is imperative for agencies such as the U.S. Coast and Geodetic Survey to obtain continuous accurate measurements of the tidal variation in navigable waters.

Many existing tide-measuring devices employ a pressure-sensitive element which is adapted to operate a recording or registering mechanism. The devices must be extremely rugged to withstand severe tidal and pressure conditions existing at ocean bottoms, must be self-contained to avoid the necessity of an outside power supply and must be compact enough to permit easy handling in depositing and recovering them from the ocean floor. Prior devices of the general type have required the pressure-sensitive element to perform appreciable work in actuating the recording or registering mechanism employed with the device. The resulting loading on the pressure element results in a marked decrease in sensitivity.

It is therefore an immediate object of this invention to provide a pressure-type tide gage in which the pressure-sensitive element is isolated from the loading effects of the recording or registering mechanism.

An additional object of this invention is to provide a pressure-type tide gage in which the pressure-sensitive element serves as a control for the recording or registering mechanism but is not required to exert any significant effort in connection with operating the latter.

An additional object of this invention is to provide a tide gage employing a pressure-measuring mechanism in which pressure changes are manifested by a spatially displaced light-ray.

A further object of this invention is to provide a pressure-type tide gage which employs an improved system of recording which is particularly adaptable to a non-mechanical follow-up type of recording mechanism.

Other uses and advantages of the invention will become apparent upon reference to the specification and drawings in which Fig. 1 is an isometric view showing the measuring and recording portion of the tide gage according to this invention;

Fig. 4 is a sectional view taken on line 4—4 of Fig. 2;

Fig. 5 is a schematic showing the electrical circuit involved, and

Fig. 6 represents a trace of typical tidal conditions as obtained through the apparatus of this invention.

In general, the principle of the present invention derives from the fact that a signal energizing means such as a beam of light can be positioned relative to a preselected point or datum in response to sensed changes in pressure and a calibrating device can then be employed to measure the position of the beam with respect to the datum as a function of the magnitude of such pressure. More specifically, in accordance with the preseent invention a recording device such as a stylus is driven at a constant rate with respect to a recording medium and the direction of motion of the stylus is changed at periods determined by changes in pressure which reflect tide variations, thereby producing a variable amplitude type of record as illustrated in Fig. 6, the upper contour constituting a record of the measured tidal variations.

In accordance with the principles of this invention the stylus is driven preferably at a uniform rate with respect to a constantly rotating-drum recording medium and a record is made of the departure of the stylus from an established datum. The motion of the stylus is cyclically reversed by means of a reversible screw drive controlled by a reversing mechanism keyed to a switch system and pressure response control means. A pressure-sensitive measuring element which may be in the form of a Bourdon tube or similar device is non-mechanicaly connected to the system by suitable means such as an optically-coupled photocell arrangement and causes a reversal in the stylus drive in response to a detected pressure change. The drum is rotated at a rate corresponding to time and the locus of the peaks in the trace defined by such reversals constitutes a record of the tidal variations over a particular observation period.

The above principles are specifically embodied in the apparatus shown in Figs. 1–6 of the drawings.

Figure 3:
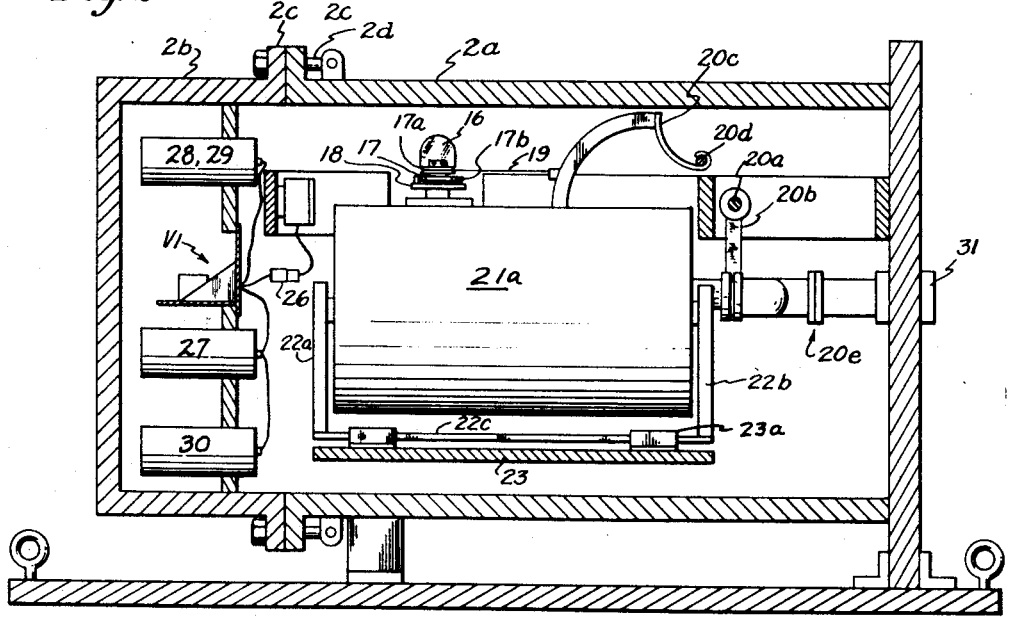
Fig. 3 is a side sectional elevation showing the tide gage together with the power supply and amplifier compartment attached.

The tide gage comprises a bed plate 1 equipped with lifting pads 1a adapted to serve as a frame for the tide gage and for supporting the gage on the ocean bed. The tide gage is contained in a water-tight housing 2 of general cylindrical configuration. One end of the housing 2 is rigidly secured to a vertical supporting plate 3 carried by the bed plate 1. The cylindrical housing is made in two parts as indicated in Fig. 3 defined by the abutting flanges 2c. In order to secure access to the mechanism occupying the interior of the housing, each of the sections 2a and 2b of the housing is provided with registering clamping flanges 2c—2c. Preferably the portion 2b of the housing is hinged to the portion 2a by a carrier hinge (not shown) and pivotedly mounted bolts 2d rigidly secure the two housing portions together.

The portion 2b of the housing contains a bank of batteries 27—29, an amplifier VI, and a disconnectable multiple plug 26 for connecting the batteries and amplifier with the circuitry associated with the measuring and recording mechanism which occupies the interior of the housing portion 2a.

Figure 1:
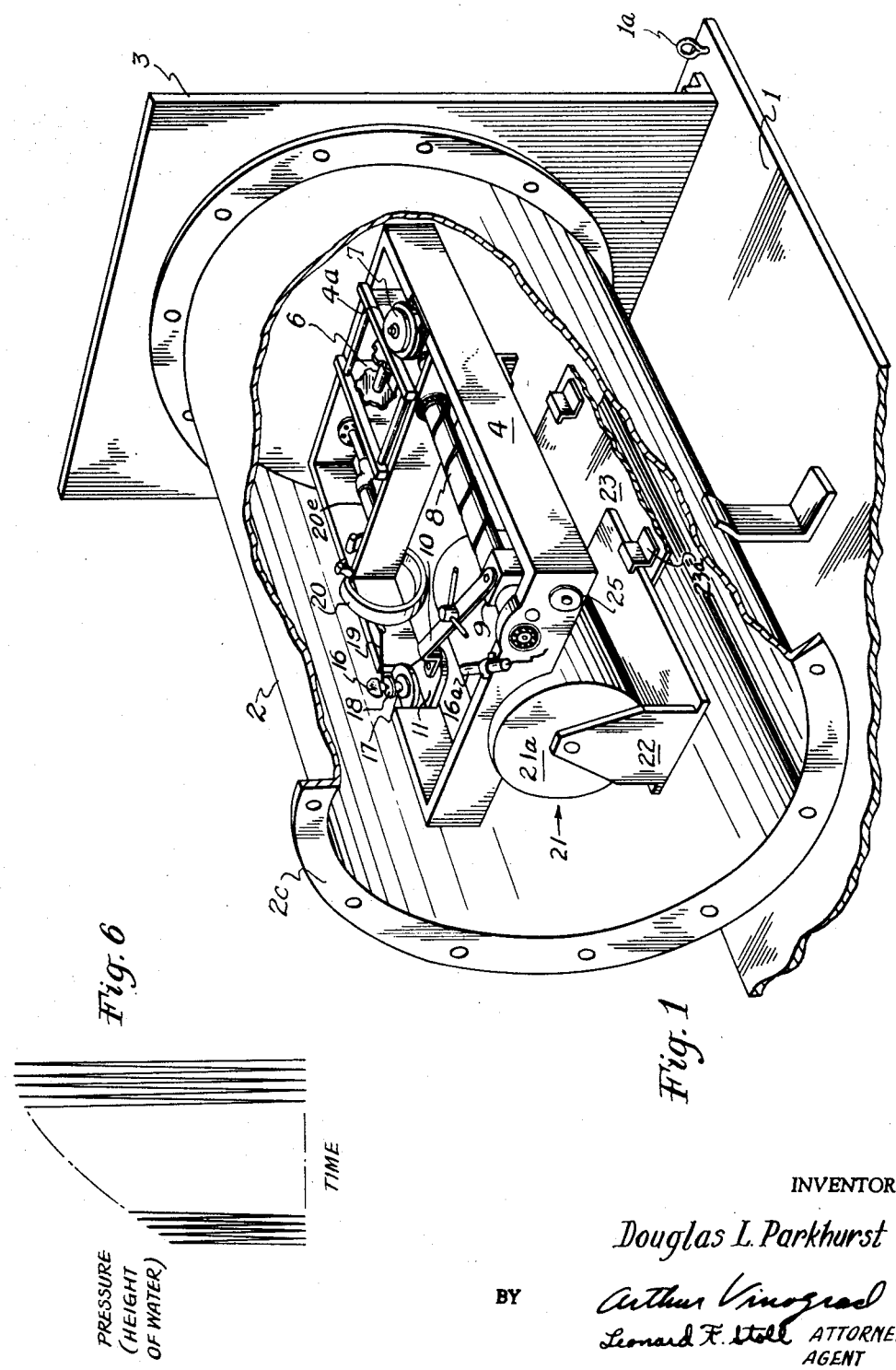
Figure 2:
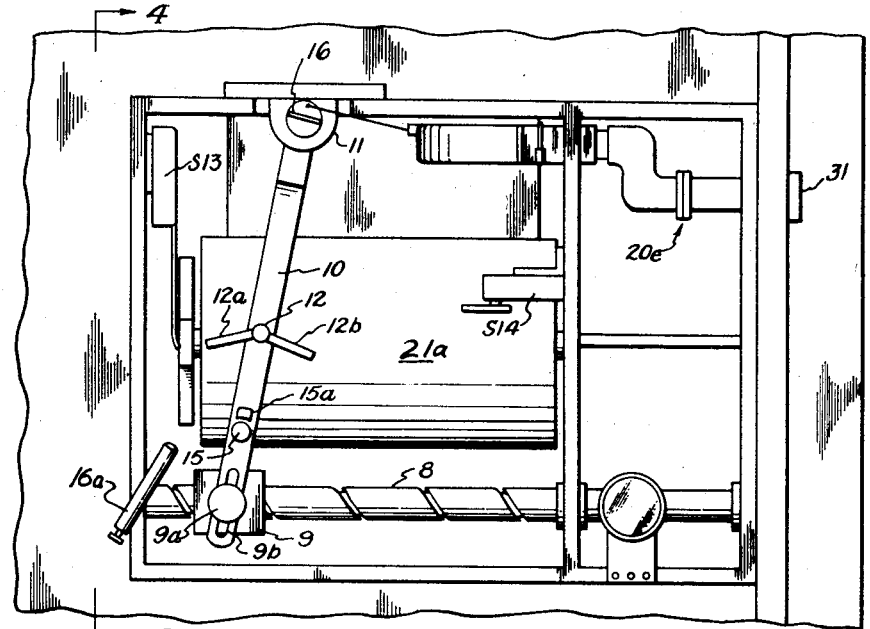
Fig. 2 is a top view of a portion of the tide gage shown in Fig. 1.

The tide measuring and recording mechanism comprises a substantially rectangular frame 4 (Fig. 1) which is welded or otherwise rigidly secured to the supporting plate 3. The frame is suitably partitioned as shown in Figs. 1 and 2 to provide supporting flanges for the various elements of the mechanism. A clock motor assembly 6 is mounted within one of the described compartments and the output shaft of the motor is brought out through a flange 4a of the frame and is connected to a reversible drive mechanism 7. A stylus feed screw 8 is mounted longitudinally of the frame as shown in Figs. 1 and 2 and is rotatably supported in suitable bearings provided in the end and intermediate flanges of the frame 4. One end of the feed screw adjacent the reversing mechanism, is brought out through an intermediate flange and is operatively coupled to the referred-to reversible drive 7.

The reversible drive mechanism 7 is a conventional type of solenoid operated reverse mechanism employing a pair of bevel gears (not shown) cooperating with a shiftable sleeve. The output shaft of the clock is provided with a bevel pinion (not shown) adapted to engage both bevel gears. The shiftable sleeve is slidably mounted on the referred-to extension of the feed screw shaft 8, intermediate of the bevel gears, and is drivingly engaged therewith by a suitable spline or key connection. The shiftable sleeve is provided with teeth at each end adapted to engage corresponding teeth on each of the bevel gears. A pair of solenoids 7a, 7b (Fig. 5), the armatures of which are coupled to the sleeve are provided in order to selectively position the sleeve in engagement with either of the two bevel gears. Since the bevel gears are drivingly engaged by the pinion on the clock shaft it will be apparent that the direction of rotation of the feed screw 8 will be determined by the energization of either of the solenoids 7a or 7b.

As shown in Figs. 1 and 2, a stylus feed nut 9 is mounted on the feed screw 8 and is confined for slidable movement longitudinally of the axis of the feed screw. A control arm 10 is pivotally connected to the feed nut 9 by means of a suitable pin and slot connection 9a, 9b (Fig. 2). The remote end of the control arm 10 is pivoted at 11a to a flange 11 fixed to one side of the frame 4 (see Fig. 4). In accordance with such construction the control arm 10 will be reciprocated through an arcuate path defined by the pivot point 11a as a center, as the feed screw 8 is rotated in either direction.

Referring specifically to the view of the mechanism illustrated in Fig. 2, the control arm 10 is provided with a switch control member 12. One portion 12a of such member is adapted to engage the operating lever of a datum point switch S13 which is operatively connected in an electrical control circuit, to be described, so as to reverse the direction of rotation of the feed screw 8 when the nut 9 is in an extreme left-hand position with respect to the feed screw, as viewed in Figs. 1, 2, and 3. Such position marks the point of departure of the stylus as it is caused to execute cyclic excursions relative to the record medium and further defines a reference datum from which the pressure amplitudes are measured. The second arm 12b of switch control member 12 is adapted to engage a safety switch S14 mounted on the intermediate flange of the frame 4. The latter switch is operatively connected in the control circuit in parallel with the circuitry of a relay R, which is operated by a photo-sensitive device 15 to be described, so as to reverse the direction of travel of the stylus nut 9 in the event the feed screw 8 is not reversed by the action of the light-ray falling on the photocell 15, before the nut reaches the extremity of its right-hand traverse, as may occur in the event of failure of the light source.

The referred-to photosensitive detector 15 is mounted on control arm 10 together with a focusing lens 15a. The photo-sensitive detector 15 which may be a photo-transistor is adapted to intercept a light beam from a mirror 16 (Figs. 1 and 3) which is adjustably mounted on a ledge 13 on the side flange of the frame 4 adjacent the pivot for the servo arm 10, as shown in Fig. 4. Specifically, as shown in Fig. 3, the mirror 16 is carried in a slot provided on a spindle 17. The spindle includes a sector-shaped flange 17a which is provided with a groove in which a filament 19 is threaded and the end of which is extended to engage a boss provided on a Bourdon tube 20 to be described. The spindle is rotatably mounted within a flanged pedestal 18 (see also Fig. 4) and a hair spring 17b is anchored to the spindle 17 and to the pedestal 18 by means of pin 18a. It will be apparent that movement of the Bourdon tube will be transmitted through the filament 19 to rotatably position the spindle 17 and mirror 16 against the action of the restoring spring 17b.

A light-ray source 16a is mounted on the frame 4 as indicated in Fig. 2 and is aligned with the axis of the mirror 16. In accordance with the operation of the tide gage, as will be described, the mirror 16 will be adjustably positioned to an angle relative to light source 16a corresponding to a particular height of tide and will assume a different angular position for each variation in observed tide. The fixed incident light-ray from the source 16a will therefore be reflected by mirror 16 to define a light beam which is spatially related to the light source, at an angular position representing the magnitude of the measured tide.

The recorder 21 comprises a rotatable drum 21a carrying a suitably ruled record sheet and is mounted on a carriage 22 beneath the frame 4 as is more clearly shown in Figs. 1 and 3. The drum carriage comprises end plates 22a, 22b (Fig. 3) secured to cross bars 22c. A transverse supporting plate 23 is secured interiorly of the housing 1 and is provided with suitable guides 23a through which the edge portions of the cross bars 23 are slidably mounted. In this manner the recording drum mechanism can be easily withdrawn from its position beneath the frame 4 when the end portion 2b of the housing is disconnected.

The record mechanism is a standard clock-driven cylinder such as is employed in the U.S. Coast and Geodetic Survey standard portable automatic tide gage and is fully described in U.S. Department of Commerce, Coast and Geodetic Special Publication No. 196 entitled "Manual of Tide Observations." The cylinder contains an 8-day spring-driven clock movement which is adapted to rotate the drum at any convenient rate such as once in every 48 hours. For convenience, the circumference of the cylinder may be 19.2 inches and is therefore advanced relative to the stylus at a rate of 0.4 inch per hour, the time scale of the record. The time scale comprises the base line or abscissa in the graphic representation of a typical tide record obtained from the apparatus of this invention as depicted in Fig. 6. The record sheet is mounted on the drum so that the abscissa or base line marked "time" in Fig. 6 is located at the left-hand portion of the drum corresponding to the referred-to preselected point or reference datum.

The stylus feed screw 8 is provided with a square screw thread with a pitch of 0.4 inch. The nut 9 is threadingly engaged with the threads on the screw by means of an internal pin (not shown) for longitudinal translation with respect to the axis of the record drum. As is best seen in Fig. 4, the nut carries a dependent stylus arm 24 having a laterally extending stylus 24a. The stylus may consist of a suitable pen, pencil or inscriber adapted to mark the surface of the record medium carried on the drum. A weight 24b is carried in offset relation to the stylus arm as indicated in Fig. 4. In this manner positive engagement between the inscriber and record sheet is insured. Because of such pivotal engagement, moreover, the stylus may easily be withdrawn merely by swinging the nut 9 in a counterclockwise direction as viewed in Fig. 4. Such action is accomplished by a knob 25 (Fig. 1) having an extension link or crank arm 25a, a portion of which is shown in Fig. 4. By turning knob 25, the crank arm 25a bears against and rotates nut 9 counterclockwise and retracts the stylus when servicing the recorder.

The pressure sensing device comprises a Bourdon tube 20 which is rigidly anchored to the frame 4 by means of a bolt 20a (Fig. 3) and brace 20b. The remote end of the tube is nonrigidly secured to the frame by a flexible connector 20c and a pin 20d. Suitable couplings 20e are provided as shown in Figs. 2 and 3 connecting one end of the Bourdon tube 20 to a port 31 communicating with the exterior of the case. It will be apparent that tidal variations reflected as pressure changes are sensed by the Bourdon tube, and the angular position of the mirror 16 with respect to the reference datum defined by the beam of light from light source 16a, will be a measure of the tide height.

The section 2b of the housing contains a plurality of batteries 27—29 and an amplifier unit V1 which form part of the photoelectric circuit. The power supply and amplifier leads are brought out through a multiple cable connector 26 which is adapted to be detachably connected with the electrical control circuit for the feed screw forming part of the measuring and recording mechanism housed in portion 2a of the assembly.

Fig. 5 is a circuit schematic of the power supply and electrical control circuit including the photo-sensitive device 15, which is mounted on the control arm 10. The clock motor assembly 6 described in connection with Fig. 1 is indicated in Fig. 5 as being energized from a 6-volt battery source 27. The referred-to reversing mechanism 7 is represented in Fig. 5 by a double solenoid 7a, 7b which is cooperatively related with the referred-to switch S13, photo-transistor device 15 and its amplifier, and safety switch S14. The operative elements 10, 12 for the switches shown in Figs. 1 and 2 are diagrammatically indicated by broken lines in Fig. 5.

For purposes of description, the solenoid 7a and switch S13 determine translatory movement of the stylus nut 9 from left to right as viewed in Figs. 1 and 2, while the solenoid 7b and photo-transistor 15, through its amplifier and relay R determine translatory movement of the stylus nut from right to left. Switch S14 is connected electrically in parallel with the circuitry of the switch in relay R and serves as a safety device to effect reversal in case of failure of the photo-transistor or its amplifier. The solenoid 7b is energized by a photo-transistor 15 as will be described. The stylus unit is normally cyclically translated relative to the rotating drum by the feed screw 8 from left to right and vice versa to define a zig-zag trace on the recording medium as illustrated in Fig. 6. Assuming that the recording mechanism has been activated so that the stylus nut is moving from right to left, the stylus will trace a line approaching the base line marked "time" on the record sheet representation shown in Fig. 6. When the stylus is at such reference datum position, the switch actuator 12a on the servo arm 10 (Fig. 2) will close the switch S13 momentarily and the subsequent triggering of solenoid 7a will produce a reversal in the direction of travel of the stylus nut from left to right. The time of such reversal is determined by switch S13 and the left-hand excursion of the stylus will therefore uniformly terminate at a point corresponding to the base line on Fig. 6. A line will accordingly be recorded extending upwardly from the base line as viewed in Fig. 6. If, during such movement of the stylus, a change in pressure due to a tide variation is detected by the pressure-sensing mechanism 20, the photo-sensitive element 15 will, in a manner to be described, momentarily energize the solenoid 7b of the reversing mechanism and the direction of motion of the recording stylus will be abruptly reversed so as to trace a line approaching the base line (Fig. 6). The line will continue to be drawn in this manner until the base line is reached at which time the actuator 12a (Fig. 2) will again actuate the switch S13 to produce reversal of the stylus motion as before.

In operation, the feed screw 8 is normally driven at a constant rate by clock motor assembly 6 in a direction such that the stylus nut 9 will be translated from left-to-right as indicated in Fig. 2. The control or servo arm 10, which is pivotally mounted at pivot point 11a, as indicated in Fig. 4, carries the photo-transistor 15 in an arcuate path relative to the mirror 16. For a particular pressure sensed by the Bourdon tube 20, the mirror 16 will be positioned at an angle, as determined by the equilibrium in the forces exerted by the torsion spring 17b and Bourdon tube 20 respectively, with respect to the referred-to reference datum defined by the light beam from light source 16a. The light ray reflected by the mirror 16 from source 16a (Fig 2) will also be positioned at a like angle relative to such datum. During a to-and-fro cyclical movement of the stylus and control arm, the photo-transistor 15 will intercept the light beam reflected by mirror 16 at a point corresponding to a measurable departure or spatial displacement from the base line or reference datum. So long as the tide remains unchanged, therefore, the photo-transistor will always be energized at the same period as measured from the base line in the record representation of Fig. 6, and since the photo-transistor 15 energizes the sensing solenoid 7b as will be described, the motion of the stylus will be abruptly reversed and driven from right to left. The locus of the peak points so delineated will therefore be defined by a straight horizontal line parallel to the base line as the stylus executes repeated cycles over a period of time. Should a pressure change due to a tide variation be sensed, the pressure-detecting mechanism comprising the Bourdon tube and the torsion spring 17b will effect a repositioning of the mirror 16 and the angular position of the reflected light beam will be moved either to the right or to the left of its previously-described position depending upon whether the tide has risen or fallen. In other words, the angular position of the reflected light-ray will be proportional to the magnitude of the measured height of tide and will therefore produce energization of the photo-transistor 15 at a period measured from the base line which is likewise proportional to the magnitude of the tide height. Since such periods are manifested by an abrupt reversal in the travel of the stylus nut 9 (i.e., from right to left), the height of each resulting peak point measured from the base line in the graphic representation of Fig. 6 will correspond to the magnitude of the tide at a time corresponding to the position of the recording drum. The locus of the peak points will therefore define a graphical representation of the tide variations.

It will be apparent from the above description that the incident light beam from source 16a defines a reference datum position. The pressure reponsive element 20 by angularly positioning the mirror 16 in response to pressure variations establishes a control effect represented by the reflected light beam from the mirror 16, which is spatially related to the datum position.

The signal generated by the photo-transistor 15 in response to the impinging light-ray is amplified by tube VI in Fig. 5. Conduction of tube VI causes energization of the relay R and closure of the normally open relay contacts R1. An energization path is therefore established from the negative terminal of the 6-volt battery 27 through reversing solenoid 7b, contacts R1 to the positive terminal of the 6-volt battery. Such momentary energization of the photo-transistor 15 and reversing solenoid 7b is sufficient to produce the described reversal in the direction of motion of the stylus.

The broken lines shown in Fig. 5 indicate the referred-to disconnectable connection 26 between the electrical components carried in sections 2a and 2b of the housing. The 45-volt battery 28 provides the necessary bias for the photo-transistor 15 while a second 45-volt battery 29 provides the plate potential for the tube VI. Heater current for the 1S5 amplifier tube VI is obtained from the 1.5-volt battery 30.

It is apparent that various modifications and variational embodiments of the structure exemplifying the principles of the present invention are possible. While a zig-zag record representation is convenient and desirable, it is obvious that each tidal variation can readily be recorded as a single mark by employing a stylus drive that translates the stylus in a single direction with respect to the recording drum. According to such modification, the pressure sensing mechanism would be arranged to cause a normally remote stylus to contact the record medium on occurrence of a pressure change. The use of a pivotally arranged mirror as the reflecting means is also optional. Various means whereby the light beam may be positioned so that it can be detected at measured periods which are proportional to a particular pressure magnitude are feasible. For example, the mirror 16 can be mounted on a slide which is physically translated by the Bourdon tube. Also the mirror, whether pivotally or shiftably mounted, can be replaced with a unitary light source if desired. Mechanical means may also be used to effect reversal of stylus motion in place of the light-ray photo-transistor method, one form being a straight line cam rotated on pivots by the pressure-sensing element, this cam serving as a stop to actuate a reversing switch to change direction of stylus nut 9 from right to left.

It will be apparent that the embodiments shown are only exemplary and that various modifications can be made within the scope of invention as defined in the appended claims.

What is claimed is:

1. In a tide gage having means for sensing pressure changes consequent to tidal variations, a mechanism for recording the tidal variations measured by said pressure-sensing means comprising: a record medium, recording means, controllable drive means adapted to continuously displace said recording means at a uniform rate relative to said record medium, reversing means adapted to reverse the direction of motion of said recording means at a preselected point on said record medium, a light-ray source, means operated by said pressure-sensing means for displacing said light ray at varying spatial positions with respect to said preselected point on said record medium consonant with sensed pressures, and control means operatively connected to said controllable drive means and adapted to be energized by said light ray to reverse the direction of motion of said recording means relative to said record medium whereby sensed pressures will be manifested as an observable envelope on said record medium.

2. In a tide gage having means for sensing pressure changes consequent to tidal variations, a mechanism for recording the tidal variations measured by said pressure-sensing means comprising: a record medium, recording means, said record medium comprising a rotating drum the axis of which is parallel to the direction of translation of said recording means, controllable drive means adapted to continuously translate said recording means relative to said record medium at a uniform rate, reversing means adapted to reverse the direction of motion of said recording means at a preselected point on said record medium, a light-ray source, means operated by said pressure-sensing means for displacing said light ray at varying spatial positions with respect to said preselected point consonant with sensed pressures, control means operatively connected to said controllable drive means, said control means adapted to be energized by said displaced light ray to reverse the direction of motion of said recording means relative to said record medium whereby said sensed pressures will be manifested as an observable envelope on said record medium.

3. In a tide gage having means for sensing pressure changes consequent to tidal variations, a mechanism for recording the tidal variations measured by said pressure-sensing means comprising: a record medium, recording means, said record medium comprising a rotating drum the axis of which is parallel to the direction of translation of said recording means and driven at a uniform rate corresponding to a time factor in a direction perpendicular to the direction of translation of said recording means, reversing means adapted to reverse the direction of motion of said recording means at a preselected point on said record medium, controllable drive means for translating said recording means relative to said record medium at a uniform rate, a light-ray source, means operated by said pressure-sensing means for angularly displacing the light ray at varying angular positions with respect to said preselected point on said record medium consonant with sensed pressures, and light-sensitive control means on said recording means operatively connected to said controllable drive means and adapted to be energized by said displaced light ray to reverse the direction of motion of said recording means relative to said record medium whereby sensed pressure will be manifested as an observable envelope on said record medium.

4. The invention as defined in claim 3 in which said controllable drive means comprises a selectively reversible drive having signal-responsive reversing means and in which said control means comprises photo-sensitive means carried by said recording means for energizing said signal-responsive reversing means when intercepted by said light ray.

References Cited in the file of this patent

UNITED STATES PATENTS

| | | |
|---|---|---|
| 484,411 | De Forest | Oct. 18, 1892 |
| 1,412,586 | Welch | Apr. 11, 1922 |
| 1,897,850 | Pierre | Feb. 14, 1933 |
| 1,958,909 | Chappell | May 15, 1934 |
| 2,430,780 | Peterson | Nov. 11, 1947 |
| 2,472,019 | Kinderman | May 31, 1949 |
| 2,592,159 | Klebba | Apr. 8, 1952 |
| 2,692,178 | Grandadam | Oct. 19, 1954 |

OTHER REFERENCES

High Speed Photometer, an article appearing in the General Electric Review, vol. 45, No. 7, July 1942.